United States Patent
Mohseni et al.

(10) Patent No.: US 10,233,990 B2
(45) Date of Patent: Mar. 19, 2019

(54) COMPOSITE COATING FOR NOISE AND VIBRATION DAMPING AND BRAKE PAD HAVING SUCH A COATING

(71) Applicants: Robert Bosch LLC, Broadview, IL (US); Robert Bosch GmbH, Stuttgart (DE)

(72) Inventors: Hamidreza Mohseni, Naperville, IL (US); Garrett Vincent-Casner, Durand, MI (US); Ashley Simmons, Dixmoor, IL (US); David Garrett, Coleman, MI (US); Mark A. Phipps, Wayne, IL (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/636,904

(22) Filed: Jun. 29, 2017

(65) Prior Publication Data

US 2019/0003545 A1    Jan. 3, 2019

(51) Int. Cl.
*F16D 69/02*    (2006.01)
*F16D 65/092*    (2006.01)
(Continued)

(52) U.S. Cl.
CPC ........... *F16D 69/028* (2013.01); *B05D 3/002* (2013.01); *B05D 3/007* (2013.01); *F16D 65/092* (2013.01); *F16D 69/02* (2013.01); *F16D 2069/005* (2013.01); *F16D 2069/0466* (2013.01); *F16D 2200/0021* (2013.01); *F16D 2250/0069* (2013.01)

(58) Field of Classification Search
CPC ....... B05D 3/002; B05D 3/007; F16D 65/092; F16D 69/02; F16D 69/028; F16D 2069/005; F16D 2069/0466; F16D 2200/0021; F16D 2250/0069
See application file for complete search history.

(56) References Cited

U.S. PATENT DOCUMENTS 5,407,034 A * 4/1995 Vydra ................. B32B 15/08
                                            188/73.37
5,413,194 A    5/1995 Kulis, Jr. et al.
(Continued)

FOREIGN PATENT DOCUMENTS

CN    201427423 Y *  3/2010
WO    1996/035458 A2   11/1996

*Primary Examiner* — Thomas J Williams
(74) *Attorney, Agent, or Firm* — Maginot Moore & Beck LLP

(57) ABSTRACT

A coating, in particular a coating for a back side of a brake pad opposite a braking side, includes a pair of bonding layers and a composite layer. Each of the bonding layers includes an epoxy material. The composite layer is disposed between the pair of bonding layers, and includes a mixture of a rubber material and particles of a secondary material. A method for forming the coating includes coating a layer of epoxy onto the surface to be coated to form a first bonding layer, coating the mixture of the rubber material and particles of a secondary material onto the first bonding layer to form a composite layer, coating a layer of epoxy to the composite layer to form a second bonding layer, and then curing the coating via a curing process.

18 Claims, 10 Drawing Sheets

(51) Int. Cl.
*B05D 3/00* (2006.01)
*F16D 69/00* (2006.01)
*F16D 69/04* (2006.01)

(56) References Cited

U.S. PATENT DOCUMENTS

| | | | |
|---|---|---|---|
| 5,515,950 A * | 5/1996 | Kwolek | F16D 65/0006 188/250 B |
| 5,712,038 A * | 1/1998 | Yamazaki | B32B 25/10 428/411.1 |
| 5,761,184 A * | 6/1998 | Dauber | B32B 15/08 720/694 |
| 7,278,519 B2 * | 10/2007 | Iwai | B62L 1/005 188/1.11 W |
| 7,905,333 B2 * | 3/2011 | Denys | F16D 65/092 188/250 B |
| 8,869,955 B2 | 10/2014 | Parild et al. | |
| 8,895,133 B2 | 11/2014 | Nesbitt | |
| 2013/0240306 A1 | 9/2013 | Murphy et al. | |

* cited by examiner

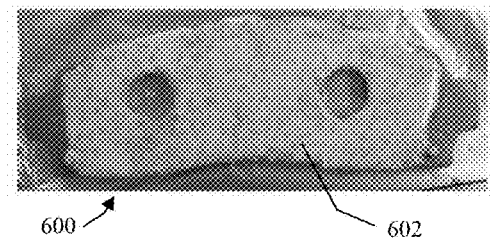
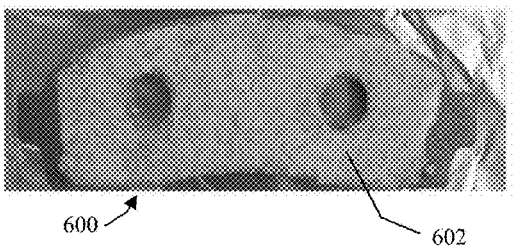
Fig. 6A
Fig. 6B
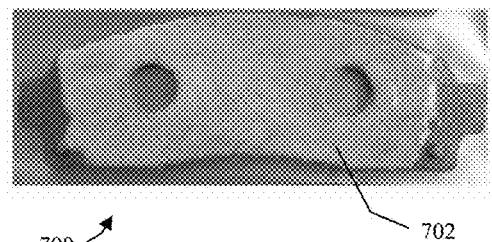
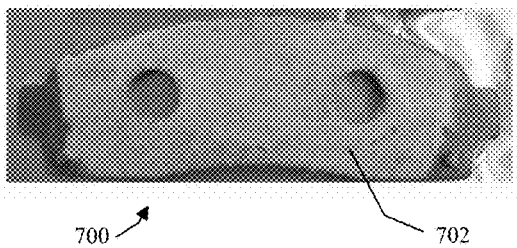
Fig. 7A
Fig. 7B
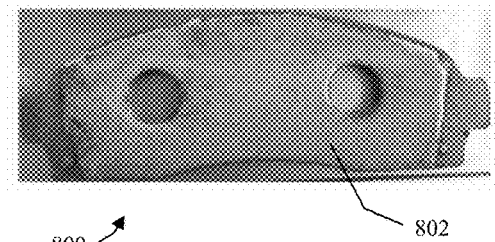
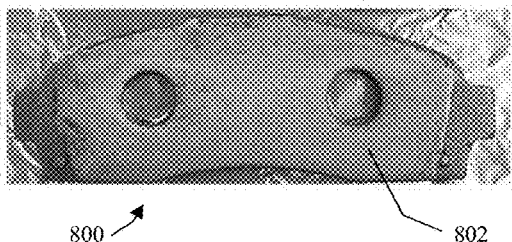
Fig. 8A
Fig. 8B

COMPOSITE COATING FOR NOISE AND VIBRATION DAMPING AND BRAKE PAD HAVING SUCH A COATING

TECHNICAL FIELD

This disclosure relates generally to material coatings for machine parts, and more particularly to coatings for automotive parts such as brake pads.

BACKGROUND

Undesirable noise and vibration produced during operation of an automotive vehicle is commonly quantified as a noise, vibration, and harshness ("NVH") rating. Automotive brakes are a common source of NVH. Specifically, the interaction between friction materials on a brake pad with a brake rotor causes the brake pad and brake rotor to vibrate, which can not only result in brake squeal, but also brake shuddering and other effects.

Various techniques have been used to attenuate the NVH of automotive brakes. Different friction materials, and the way that friction materials are shaped onto a brake pad can affect the NVH produced during operation. These techniques alone, however, are generally insufficient to reduce NVH to an acceptable level.

Another common technique for attenuating the NVH produced by a brake system is to include a damping element with the brake pad to damp the vibration caused by the interaction between the friction material of the brake pad and the brake rotor. In one example, a shim is affixed to the back side of a brake pad. A shim generally includes layers of different materials such as, for example metal, rubber, and fibrous materials. The layers are arranged in a stacked structure configured to damp vibration of the brake pad.

Damping elements, such as the examples described above, are generally susceptible to the harsh service conditions of automotive brakes. For instance, a damping element may migrate out of position, corrode, lose adherence to the brake pad or experience delamination. These issues can lead to a decrease in the damping provided by the damping element. Protecting a damping element from migration generally requires additional adhesive material or additional structural features on the back side of the brake pad. Protecting a damping element from corrosion generally requires additional protective material. These protection techniques, however, generally require additional machining or assembly of the brake pad, and may not be adaptable to some shapes and sizes of brake pads.

Therefore, a damping element for a brake pad that resists corrosion would be beneficial. A damping element that does not require additional adhesive material or structural features on the brake pad to resist migration would also be beneficial. A damping element that can be applied to a wide variety of sizes and shapes of brake pads would also be beneficial.

SUMMARY

A coating on a substrate, according to this disclosure, includes a pair of bonding layers and a composite layer. Each of the bonding layers includes an epoxy material. The composite layer is disposed between the pair of bonding layers, and includes a mixture of a rubber material and particles of a secondary material.

In some embodiments, the particles of the secondary material include at least one of steel fibers, sponge iron particles, and graphite flakes.

In some embodiments, the rubber material includes Polytetrafluoroethylene.

In some embodiments, each of the bonding layers is joined to a respective opposing side of the composite layer.

In some embodiments, the coating is free of structural fixing elements.

In some embodiments, the outer surfaces of the bonding layers are substantially parallel with each other and with the substrate.

In some embodiments, a first one of the bonding layers is directly coated onto the substrate.

In some embodiments, a nominal size of the particles of the secondary material is less than or equal to half of a nominal size of particles of the rubber material.

In some embodiments, the composite layer includes equal parts, by weight, of the rubber material and the particles of the secondary material.

In some embodiments, the coating further includes a layer of paint coated onto a side of one of the bonding layers facing away from the composite layer.

In some embodiments, the coating is configured to coat at least one surface of a brake pad and at least one of reduce a noise resulting from operation of a coated brake pad, dampen a vibration resulting from operation of the coated brake pad, and inhibit a corrosion of the at least one surface of the brake pad.

A brake pad according to this disclosure includes a backing plate and a coating. The backing plate includes a braking side and a back side opposite the braking side. The coating is disposed on the back side, and includes a pair of bonding layers and a composite layer. Each of the bonding layers includes an epoxy material. The composite layer is disposed between the pair of bonding layers, and includes a mixture of a rubber material and particles of a secondary material.

In some embodiments, the epoxy material of one of the bonding layers is bonded to the back side of the backing plate, and each of the bonding layers is joined to a respective opposing side of the composite layer.

In some embodiments, the brake pad further includes a friction material positioned on the braking side of the backing plate.

In some embodiments, the back side is free of structure configured to structurally fix the coating to the backing plate.

In some embodiments, the particles of the secondary material include at least one of, steel fibers, sponge iron particles, and graphite flakes.

In some embodiments, the rubber material includes Polytetrafluoroethylene.

A method of producing a brake pad according to this disclosure includes coating a first layer that includes an epoxy material onto a back surface of a backing plate. A second layer including a mixture of a rubber material and particles of a secondary material is coated onto the first layer. A third layer that includes the epoxy material is coated onto the second layer to form, together with the first layer and the second layer, a coating for the back surface of the backing plate.

In some embodiments, the method further includes, prior to application of the first layer, performing a degreasing and washing process to at least the back surface of the backing plate. In some embodiments, the method further includes, after application of the third layer, curing the backing plate and the coating.

In some embodiments, the method further includes applying a friction material to a braking side of the backing plate.

BRIEF DESCRIPTION OF THE DRAWINGS

FIGS. 6A-11F depict different samples used in experiments evaluating coatings according to this disclosure.

DETAILED DESCRIPTION

For the purposes of promoting an understanding of the principles of the embodiments described herein, reference is now made to the drawings and descriptions in the following written specification. No limitation to the scope of the subject matter is intended by the drawings and descriptions. This disclosure also includes any alterations and modifications to the illustrated embodiments and includes further applications of the principles of the described embodiments as would normally occur to one of ordinary skill in the art to which this document pertains.

Figure 1:
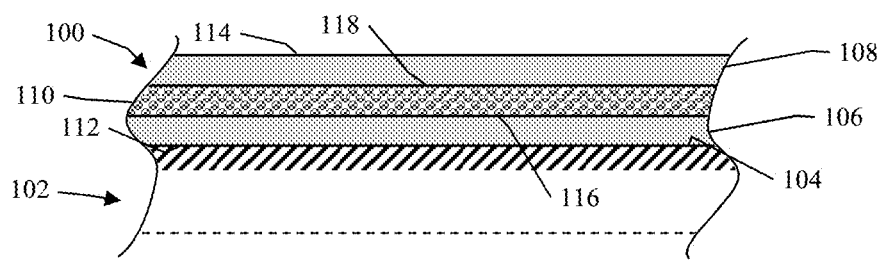
FIG. 1 depicts a side cross-section view of an exemplary embodiment of a coating disposed on a surface of an object according to this disclosure.

FIG. 1 depicts a side cross-section view of an exemplary embodiment of a coating 100 according to this disclosure coated onto a surface 104 of an object 102. The coating 100 includes a pair of bonding layers 106 and 108, and a composite layer 110. As used herein, the term "layer" and the term "coating layer" are used interchangeably and mean a thickness of material adhered to a substrate during formation. As used herein, the term "coating" means a formation of one or more coating layers adhered to and covering at least a portion of a substrate.

The bonding layer 106 includes an epoxy material. In some embodiments, the epoxy material of the bonding layer 106 is a heat resistant epoxy that is thermally stable up to at least 177 degrees Celsius. The bonding layer 106 is coated onto the surface 104 such that an outer surface 112 of the bonding layer 106 is directly adhered to the surface 104 of the object 102 via the epoxy material. The outer surface 112 is free of any structural elements configured to structurally fix the coating 100 to the object 102, such that the bonding layer 106 is exclusively joined to the surface 104 via the adhesion from the epoxy material. In this embodiment, the bonding layer 106 has a thickness in a range from about 0.1 mm to about 0.7 mm, but other thicknesses for the bonding layer are also contemplated in other embodiments.

The bonding layer 108 also includes the epoxy material, and forms an outer surface 114 of the coating 100. The outer surface 114 of the bonding layer 108 is substantially parallel with the outer surface 112 of the bonding layer 106. In other words, when viewed on edge, the outer surface 114 substantially forms an offset curve from the outer surface 112. The outer surface 114 is also free of any structural elements configured to structurally fix the coating 100 to the object 102. In this embodiment, the bonding layer 108 also has a thickness in a range from about 0.1 mm to about 0.7 mm, but other thicknesses for the bonding layer are also contemplated in other embodiments.

The composite layer 110 coated onto the bonding layer 106, and the bonding layer 108 is coated onto the composite layer 110 such that the composite layer 110 is disposed between the pair of bonding layers 106 and 108. In this embodiment, the bonding layers 106 and 108 are respectively joined to opposite sides 116 and 118 of the composite layer 110, such that the composite layer 110 is disposed directly between the pair of bonding layers 106 and 108. In other embodiments, another layer is disposed between the composite layer 110 and at least one of the bonding layers 106 and 108. In this embodiment, the composite layer 110 has a thickness in a range from about 0.2 mm to about 1.2 mm but other thicknesses for the bonding layer are also contemplated in other embodiments. The composite layer 110 includes a mixture of a rubber material and particles of a secondary material. In one example, the mixture includes substantially equal parts, by weight, of the rubber material and the particles of the secondary material.

The rubber material, in one example, is a rubber matrix formed from rubber particles. In one example, the particles of the secondary material are of a nominal size that is less than or equal to half of a nominal size of the particles of the rubber material. In one embodiment, the rubber material is Polytetrafluoroethylene ("PTFE"), which is a matrix of particles. In an example, the matrix is formed from particles having a nominal or average size of approximately 300 µm. Other materials and sizes for the particles of the rubber material are also contemplated. The particles of secondary material can be metallic, non-metallic, or mixtures thereof. Various examples of the particles of the secondary material include at least one of steel fibers having a nominal size of approximately 50 µm, sponge iron particles having a nominal size of approximately 150 µm, graphite flakes having a nominal size of approximately 50 µm, or combinations thereof. Other materials and sizes for the particles of the secondary material are also contemplated.

The coating 100, including the bonding layers 106 and 108 as well as the composite layer 110, has an overall thickness that, in this embodiment, is in a range from about 0.5 mm to about 1.5 mm. Other overall thicknesses are also contemplated in other embodiments. The coating 100, once applied to the surface 104, extends substantially parallel to the surface 104. In other words, when viewed on edge, the coating 100 substantially forms an offset curve from surface 104. While the entire portion of the surface 104 illustrated in FIG. 1 is coated with the coating 100, in some embodiments, less than an entirety of a surface is coated with the coating according to this disclosure.

Figure 2:
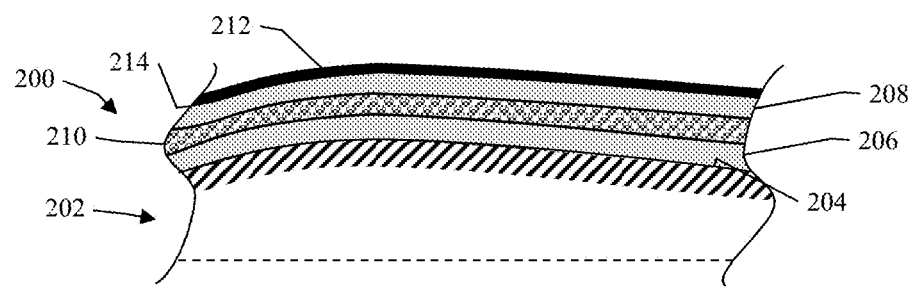
FIG. 2 depicts a side cross-section view of another exemplary embodiment of a coating disposed on a surface of an object according to this disclosure.

FIG. 2 depicts a side cross-section view of another exemplary embodiment of a coating 200 coated onto the surface 204 of an object 202. The coating 200 includes a pair of bonding layers 206 and 208, and a composite layer 210, and a paint layer 212.

Unlike the substantially planar surface 104 of the object 102 in FIG. 1, the surface 204 of the object 202 is irregular. The epoxy material of the bonding layer 206 is configured to adhere to a surface without regard to the shape of that surface. Thus, the epoxy material enables the bonding layer 206 to directly adhere to the irregular shape of the surface 204 of the object 202 without additional machining of the surface 204, and without any additional structural elements for fixing the coating 200 to the object 202. As a result, the coating 200 extends substantially parallel to the irregular surface 204 of the object 202. In other words, when viewed on edge, the coating 200 substantially forms an offset curve from the surface 204.

The paint layer 212 is coated onto the outer surface 214 of the bonding layer 208. The paint material of the paint layer 212 is configured to resist corrosion and inhibit the formation and propagation of rust.

Figure 3:
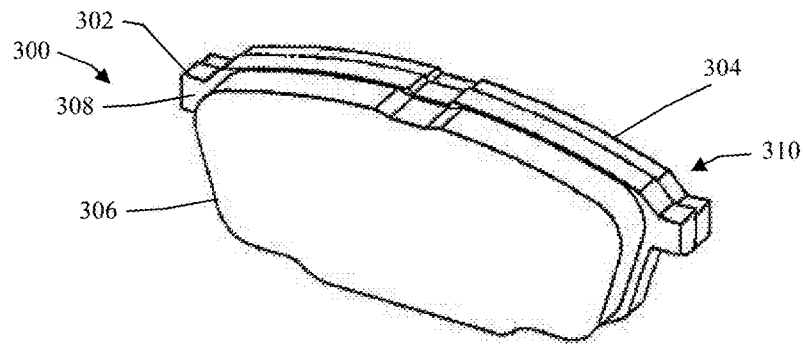
FIG. 3 depicts a perspective view of a brake pad having a coating according to this disclosure.

A coating according to this disclosure can be coated onto to a wide variety of objects. FIG. 3 illustrates an exemplary embodiment of a brake pad 300 according to this disclosure that includes a backing plate 302, a coating 304, and a friction material 306.

The backing plate 302 is a solid plate of metal, such as steel, and includes a braking side 308 and a back side 310 opposite the braking side 308.

The friction material 306 is disposed on the braking side 308 of the backing plate 302, and is configured to cooperate with a counter-braking element during operation.

The coating 304 is coated onto the back side 310 of the backing plate 302, and has a configuration similar to the coatings 100 and 200 above, and thus at least includes a composite layer with a rubber material and secondary material particles mixture disposed between a pair of bonding layers with epoxy.

The coating 304 is exclusively joined to the back side 310 backing plate 302 via the adhesion of the epoxy material in the coating 304, and thus the brake pad 300 is free of structural elements such as bolts, tabs, pins, grooves, or other structural elements configured to structurally fix the coating 304 to the backing plate 302.

The backing plate 302 illustrated in FIG. 3 is substantially flat. Since, as discussed above, a coating according to this disclosure can be applied to a surface of an object regardless of the shape of that object, backing plates of different shapes, including irregularly shaped backing plates, are also contemplated in different embodiments. Further, since a coating according to this disclosure is configured to adhere to a surface without the need for additional structural elements, no additional machining or assembly is required to secure a coating according to this disclosure to a brake pad after the coating has been coated onto the back surface of the brake pad.

Additionally while a coating according to this disclosure can be coated onto a substantial portion or all of the back side of a brake pad, such as in FIG. 3, in other embodiments, the coating is applied locally. For example, a coating according to this disclosure can be locally coated onto regions of the back side of a brake pad proximate to support ribs, attachment holes, or portions of the back surface configured to come into contact with other automotive parts.

Figure 4:
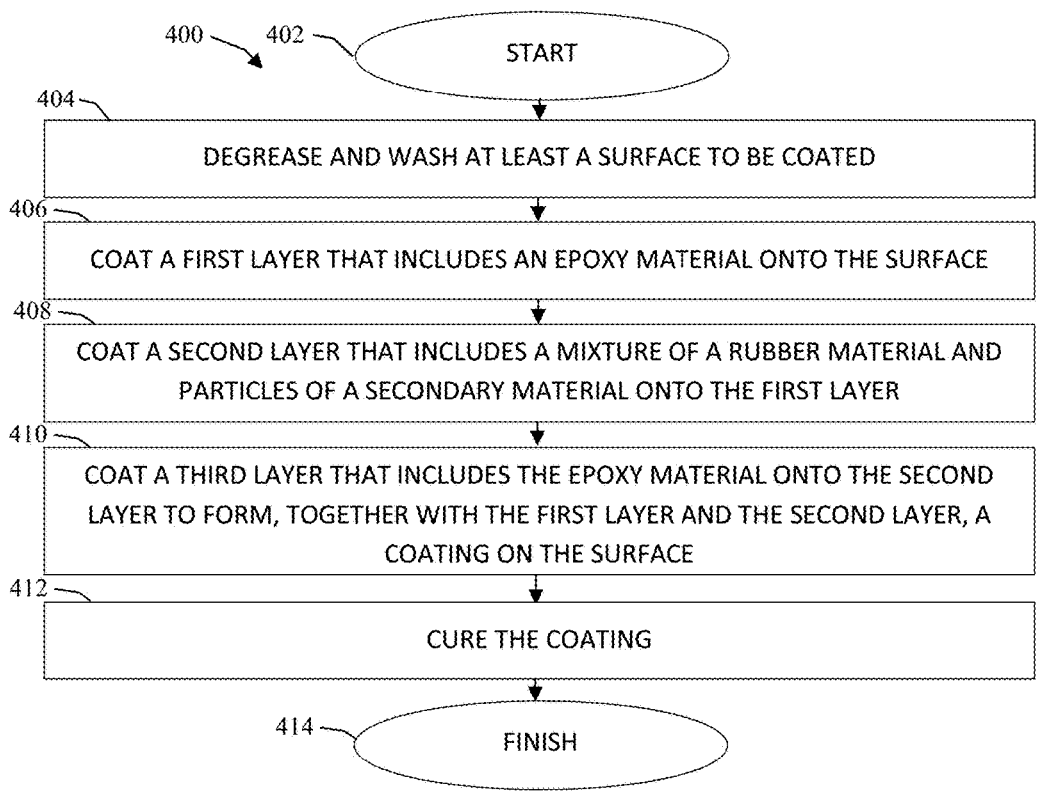
FIG. 4 is a flow diagram of an exemplary methodology for producing a coating according to this disclosure.

FIG. 4 depicts an exemplary methodology 400 for producing a coating according to this disclosure. The method starts at 402, and at 404, a surface to be coated is optionally degreased and washed to remove grease or debris such as dust or metal filings on the surface to be coated that might interfere with adhesion of the coating to the surface.

At 406, a first layer that includes an epoxy material is coated onto the surface to be coated to form a first bonding layer. At 408, a second layer that includes a mixture of a rubber material and particles of a secondary material are coated onto the first layer to form a composite layer. At 410, a third layer that includes the epoxy material is coated onto the second layer to form a second bonding layer that, together with the first bonding layer and the composite layer, forms a coating on the surface.

At 412, the coating on the surface is cured, and the method ends at 414. In one embodiment, a curing process for the coating according to this disclosure includes a plurality of curing successive curing phases or cycles.

Figure 5:
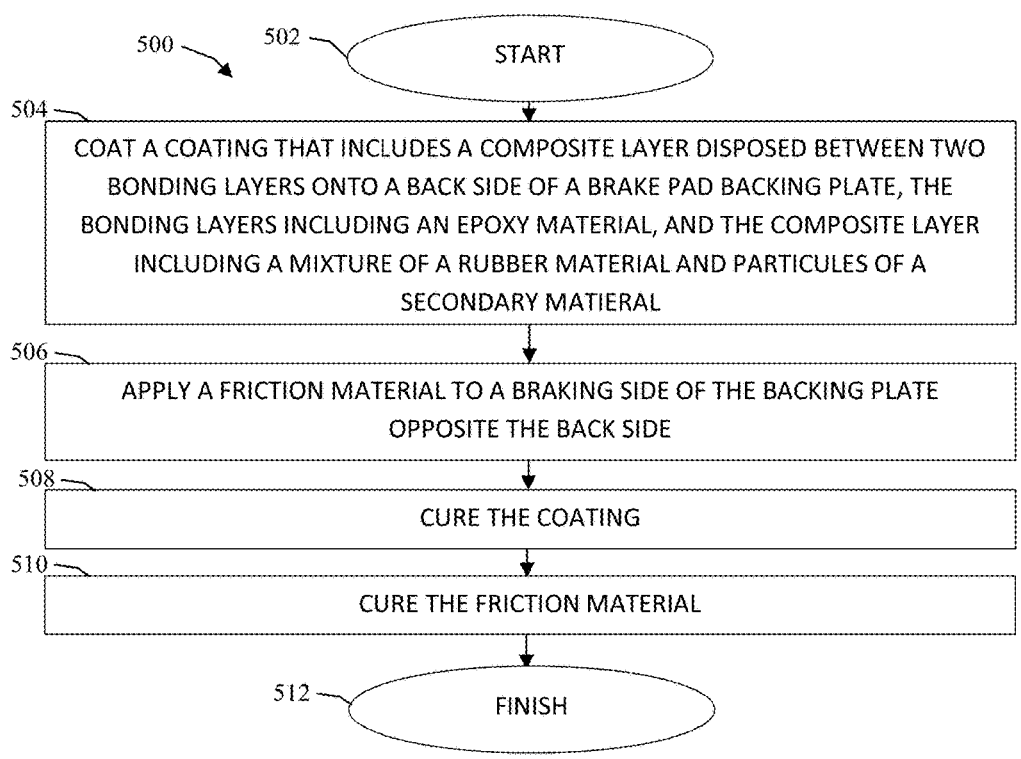
FIG. 5 is a flow diagram of an exemplary methodology for producing a brake pad having a coating according to this disclosure.

Application of a coating according to this disclosure can be conducted in conjunction with application of friction material to a backing plate. FIG. 5 depicts an exemplary methodology 500 for forming a brake pad with a coating and friction material according to this disclosure. The method 500 starts at 502, and at 504 a coating according to this disclosure is coated onto a back side of a brake pad backing plate. At 506, a friction material is applied to a braking side of the backing plate opposite the back side. At 508, the coating is cured, and at 510 the friction material is cured. In some embodiments, the coating and the friction material are cured together in a single curing process. In some embodiments, the coating is applied and cured prior to application and curing of the friction material. In some embodiments, the friction material is applied and cured prior to application and curing of the coating. In some embodiments, a single curing process includes different curing cycles or phases corresponding to the coating and the friction material, respectively. The method ends at 512.

EXPERIMENTAL RESULTS

Experiment 1—Noise Attenuation

Various sample brake pads, discussed below, were subjected to the US City Traffic Wear and Noise brake dynamometer test which includes 708 stops and 5 shifts.

Sample 1: FIG. 6A is a pre-curing image of a brake pad 600 with a back side coated with a coating 602 according to this disclosure that includes a composite layer where the secondary particles include steel fibers. Sample 1 was then cured via a curing process including the following phases: (i) kept at room temperature (approximately 27 degrees Celsius) for 24 hours; (ii) heated to 80 degrees Celsius for approximately 2 hours; and (iii) heated to 150 degrees Celsius for 3 hours. FIG. 6B is a post-curing image of the brake pad 600.

Sample 2: FIG. 7A is a pre-curing image of a brake pad 700 with a back side coated with a coating 702 according to this disclosure that includes a composite layer where the secondary particles include sponge iron particles. Sample 2 was then cured via the same curing process as Sample 1 discussed above. FIG. 7B is a post-curing image of the brake pad 700.

Sample 3: FIG. 8A is a pre-curing image of a brake pad 800 with a back side coated with a coating 802 according to this disclosure that includes a composite layer where the secondary particles include graphite flakes. Sample 3 was then cured via the same curing process as Sample 1 discussed above. FIG. 8B is a post-curing image of the brake pad 800.

Sample 4: (not depicted) This sample was a control backing plate of a brake pad that did not include any damping element such as a coating or shim. The control backing plate was subjected to the same curing process as Sample 1 discussed above.

Sample 5: (not depicted) This sample was a control brake pad that included a known shim damping element.

The results of the test, tabulated in Table 1 below include a Noise Index rating for each sample. A Noise Index rating of a sample decreases from 10 as the maximum volume of noise produced by the sample increases, and as the percentage of noise produced by the sample that is over 70 decibels over the course of the test increases. In other words, a lower Noise Index rating indicates a noisier sample.

TABLE 1

| Sample | Noise Index Rating |
| --- | --- |
| Sample 1 Steel-Fiber Composite Coating | 10 |
| Sample 2 Sponge-Iron Composite Coating | 9.9 |
| Sample 3 Graphite Flake Composite Coating | 10 |
| Control Brake Pad | 9.4 |
| Brake Pad With Conventional Shim Solution | 10 |

As illustrated in the results in Table 1 above, the coatings according to this disclosure in Samples 1-3 exhibited Noise Index Ratings that were an improvement relative to the control brake pad without a shim and comparable to a conventional shim solution. Visual inspection of the edge portion of the coated samples after the test also revealed that the coatings in Samples 1-3 had not experienced any visible delamination. Further, the coatings in Samples 1-3 did not appear to exhibit surface damage which would typically be present as a result of pressure applied via a piston caliper during operation.

Experiment 2—Corrosion Resistance

Various sample brake pads, discussed below, were subjected to the ASTM B117 salt-spray test which includes spraying the samples with a salt spray for 96 hours.

Figure 9A:
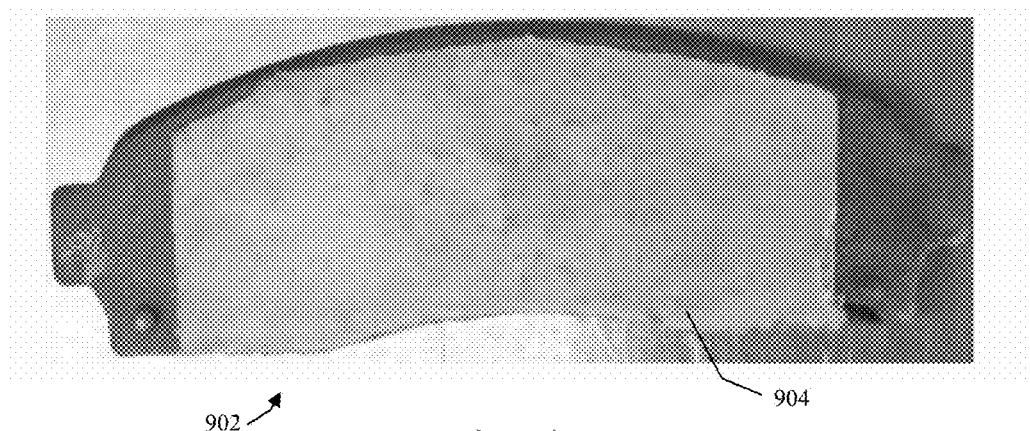

Sample 6: FIG. 9A is an image of a cured brake pad 902 with a back side coated with a coating 904 according to this disclosure that includes a composite layer where the secondary particles include steel fibers.

Figure 9B:
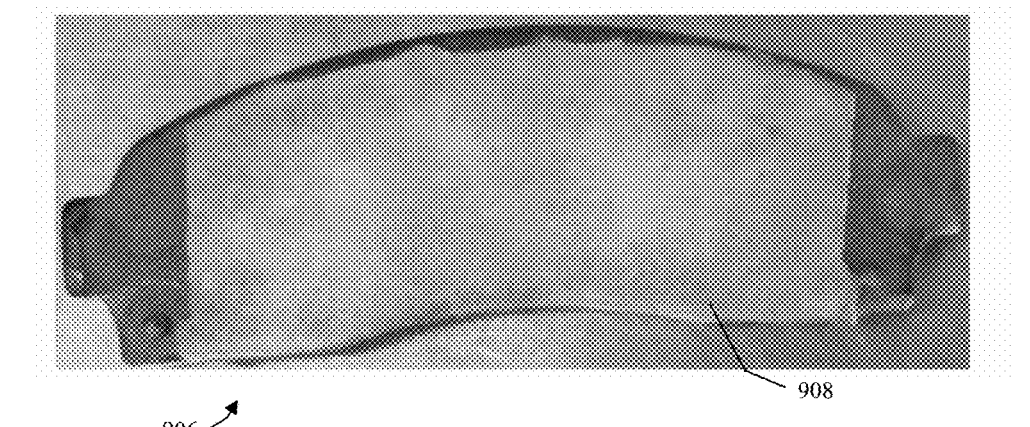

Sample 7: FIG. 9B is an image of a cured brake pad 906 with a back side coated with a coating 908 according to this disclosure that includes a composite layer where the secondary particles include sponge iron particles.

Figure 9C:
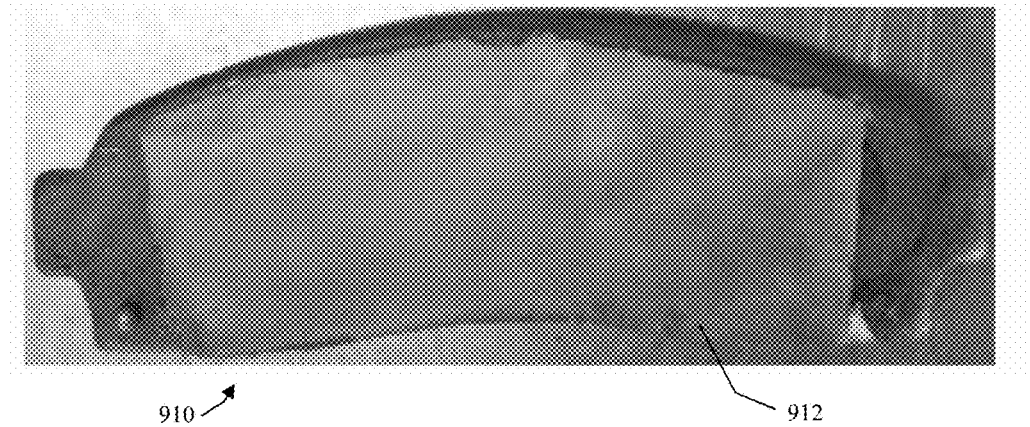

Sample 8: FIG. 9C is an image of a cured brake pad 910 with a back side coated with a coating 912 according to this disclosure that includes a composite layer where the secondary particles include graphite flakes.

Figure 9D:
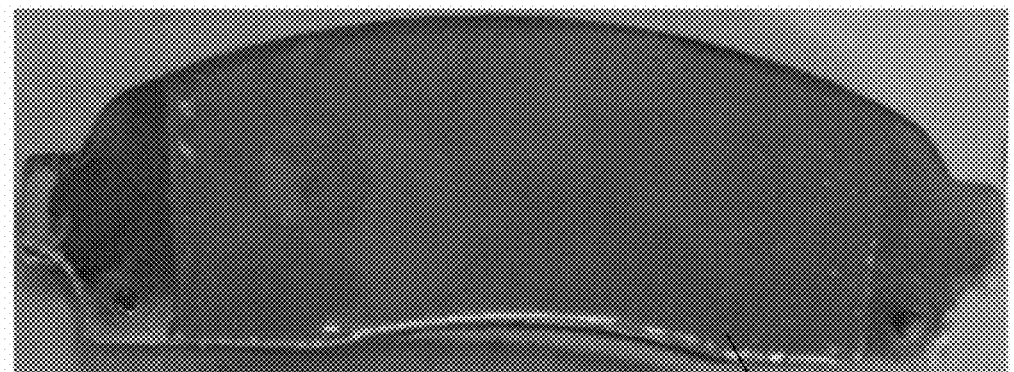

Sample 9: FIG. 9D is an image of a cured brake pad 914 with a back side coated with a coating 916 according to this disclosure that includes a composite layer where the secondary particles include graphite flakes, and that further includes a paint layer of silver paint.

Figure 9E:
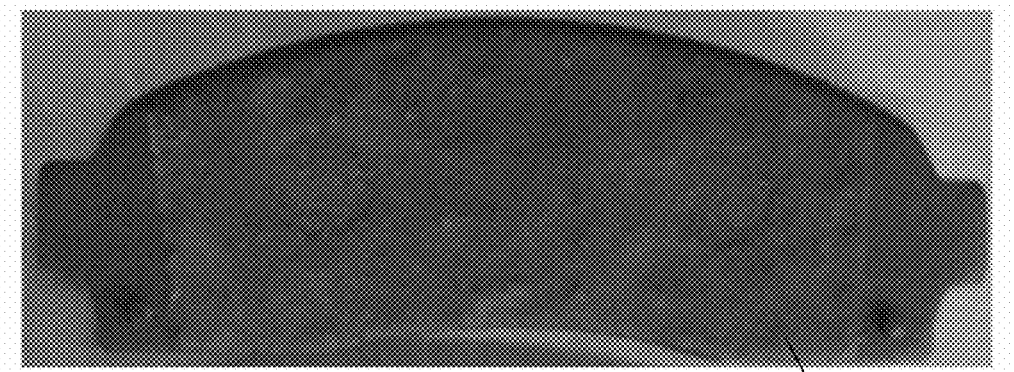

Sample 10: FIG. 9E is an image of a cured brake pad 918 with a back side coated with a coating 920 according to this disclosure that includes a composite layer where the secondary particles include graphite flakes, and that further includes a paint layer of black paint.

Figure 9F:
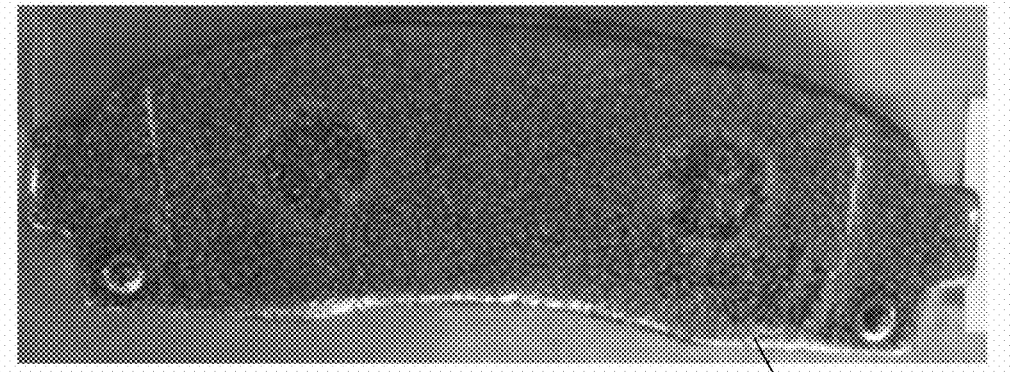
Figure 10A:
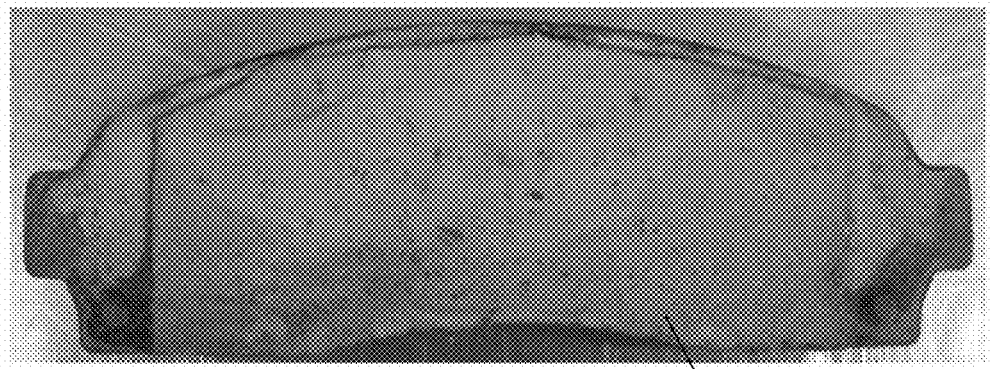
Figure 10B:
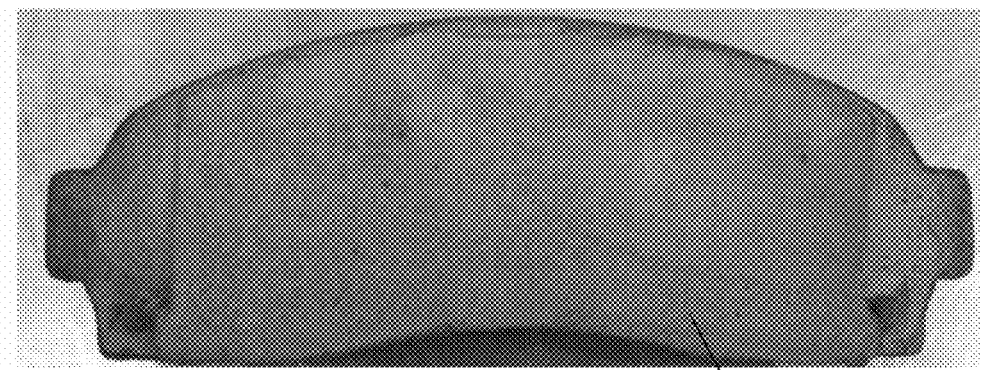
Figure 10C:
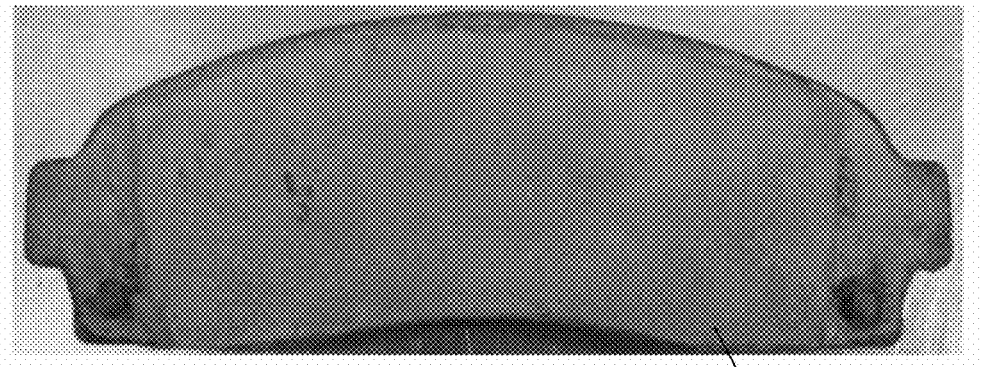
Figure 10D:
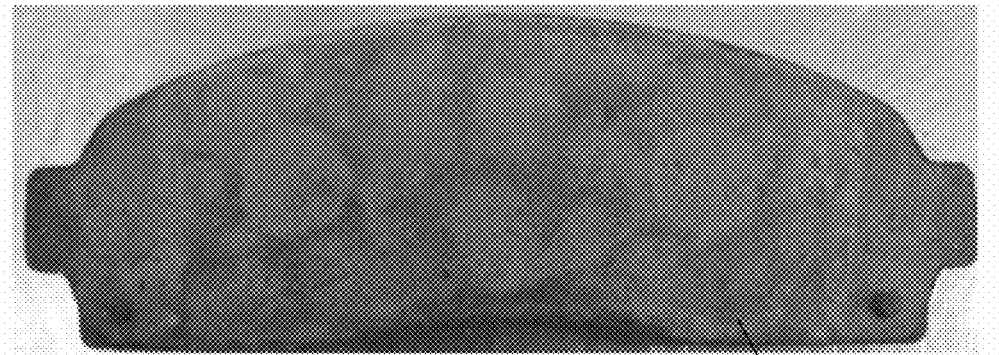
Figure 10E:
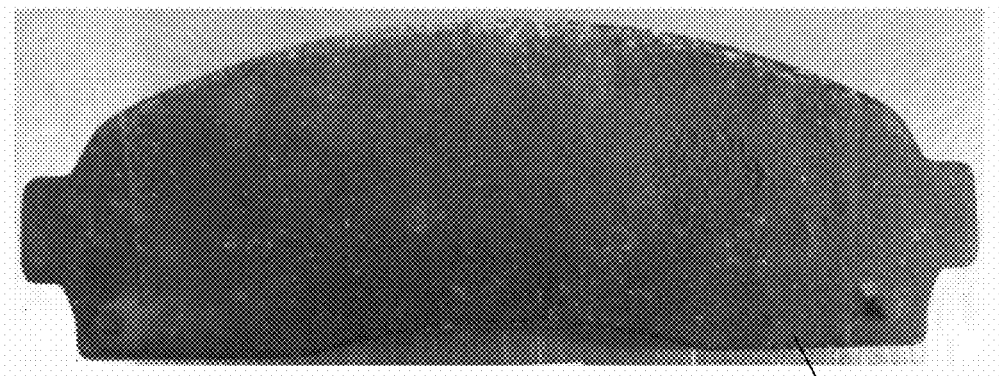
Figure 10F:
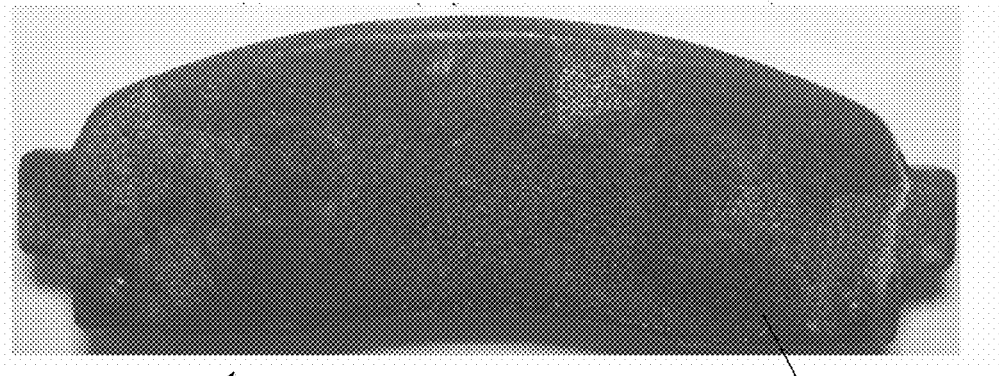
Figure 11A:
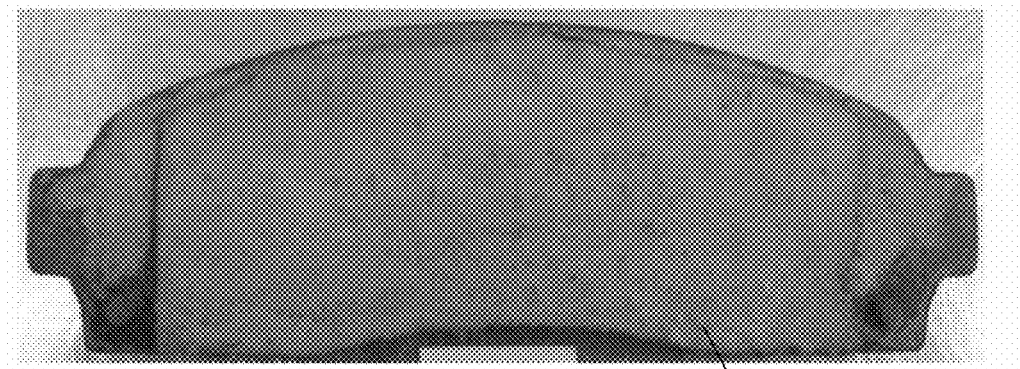
Figure 11B:
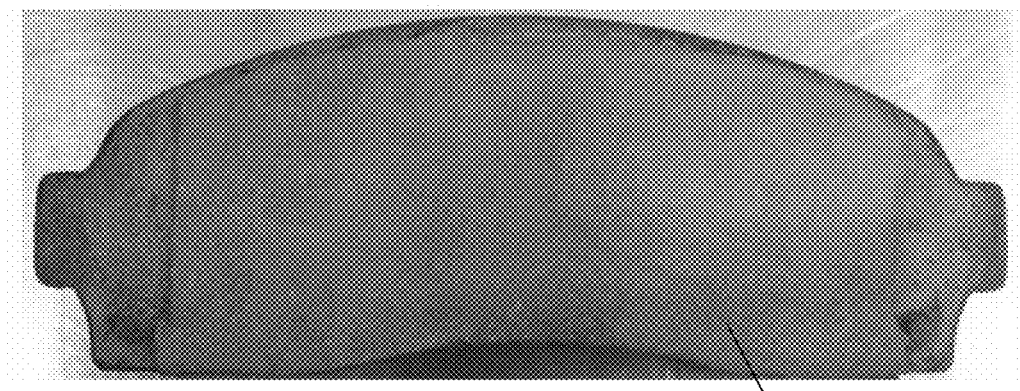
Figure 11C:
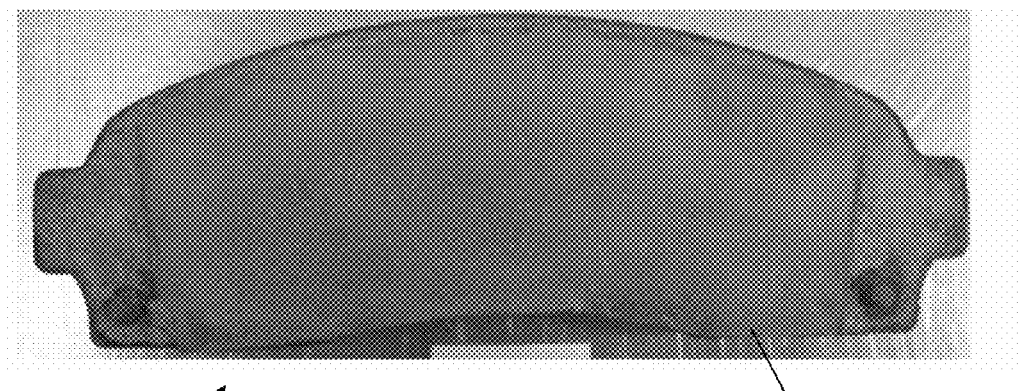
Figure 11D:
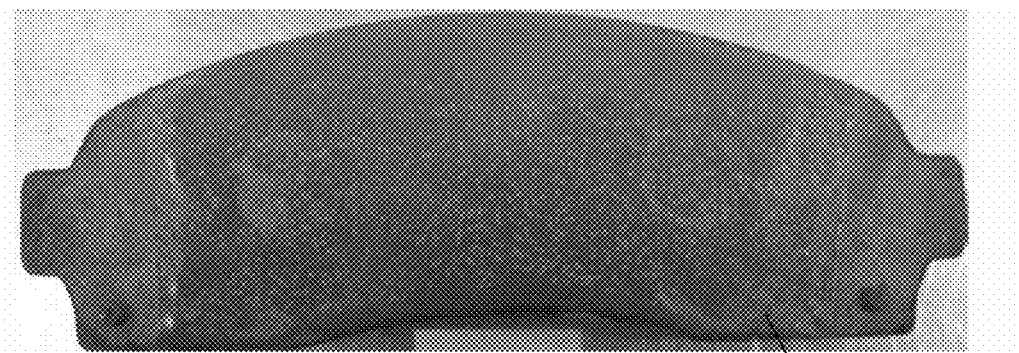
Figure 11E:
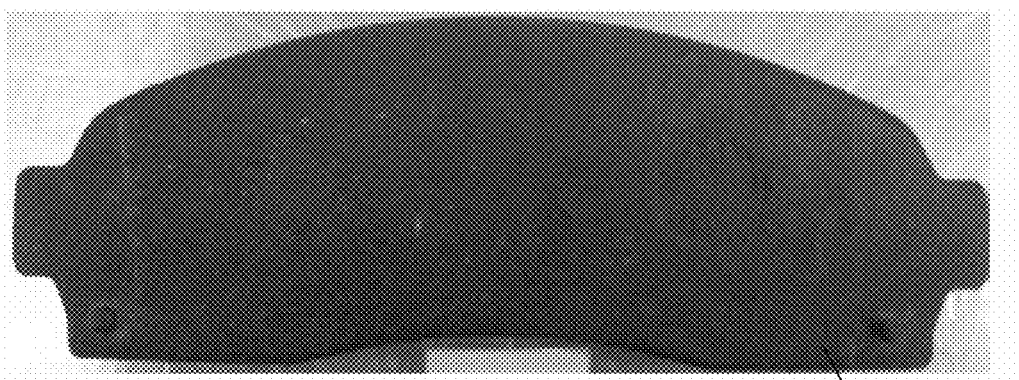
Figure 11F:
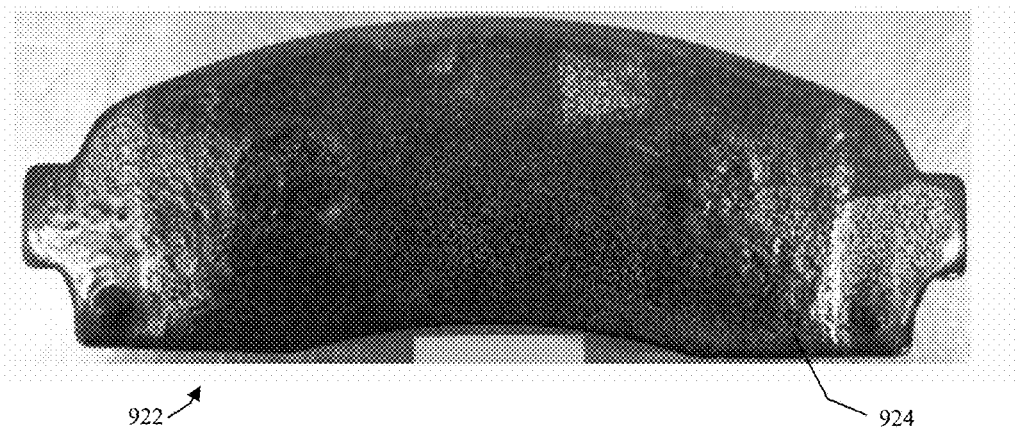

Sample 11: FIG. 9F is an image of a cured brake pad 922 with a back side coated with a coating 924 according to this disclosure that includes a composite layer where the secondary particles include graphite flakes, and that further includes a paint layer of silver vein paint.

FIGS. 10A-F depict Samples 6-11 respectively after the Samples were subjected to the salt-spray testing for 96 hours. In ASTM B117 salt-spray testing, salt-fog and a stream direction of the salt-spray commonly results in a transfer of rust from uncoated portions of the surface that are actually corroded onto un-corroded portions. To remove transferred rust and enable inspection of regions actually corroded on the respective coatings, Samples 6-11 were each rinsed with ethanol. FIGS. 11A-F depict Samples 6-11 after the ethanol rinse.

Visual inspection of the edges of the coatings 904, 908, 912, 916, 920, and 924 in Samples 6-11 after the ethanol rinse indicated that the coatings 904, 908, 912, 916, 920, and 924 did not appear to have experienced delamination or detachment from their respective backing plates, and also indicated that the coatings 904, 908, 912, 916, 920, and 924 improved a corrosion resistance of the brake pads 902, 906, 910, 914, 918, and 922 respectively. Furthermore, the rust remaining in Samples 6-8 (FIGS. 11A-C) appeared to correspond to the surface roughness (i.e. peaks and valleys) of the coatings 904, 908, and 912 respectively, and is likely the result of rust transference from corroded regions to these regions rather than actual corrosion. Visual inspection of Samples 9-11 also indicated that including a paint layer with the coating reduced rust initiation and propagation.

While coatings according to this disclosure were discussed with reference to brake pads, similar coatings according to this disclosure can also be coated onto other automotive parts, as well as non-automotive parts such as parts in power tools, construction equipment, manufacturing equipment, and other machines.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A coating on a substrate, comprising:
   a first bonding layer that includes an epoxy material;
   a second bonding layer that includes the epoxy material; and
   a composite layer that is disposed between the first and second of bonding layers, and that includes a mixture of a rubber material and particles of a secondary material, wherein a nominal size of the particles of the secondary material is less than or equal to half of a nominal size of particles of the rubber material.

2. The coating of claim 1, wherein the particles of the secondary material include at least one of:
   steel fibers;
   sponge iron particles; and
   graphite flakes.

3. The coating of claim 1, wherein the rubber material includes Polytetrafluoroethylene.

4. The coating of claim 1, wherein each of the first and second bonding layers is joined to a respective opposing side of the composite layer.

5. The coating of claim 1, wherein the coating is free of structural fixing elements.

6. The coating of claim 5, wherein outer surfaces of the first and second bonding layers are substantially parallel with each other and with the substrate.

7. The coating of claim 1, wherein the first bonding layer is directly coated onto the substrate.

8. The coating of claim 1, wherein the composite layer includes equal parts, by weight, of the rubber material and the particles of the secondary material.

9. The coating of claim 1, further comprising:
   a layer of paint coated onto a side of one of the bonding layers facing away from the composite layer.

10. The coating of claim 1, the coating configured to at least one of:

reduce a noise generated with the substrate;
dampen a vibration of the substrate; and
inhibit a corrosion of the substrate.

11. A brake pad, comprising:
a backing plate that includes:
   a braking side; and
   a back side opposite the braking side; and
a coating that is coated onto the back side, and that includes:
   a first bonding layer having an epoxy material coated directly onto the back side of the backing plate;
   a second bonding layer having the epoxy material; and
   a composite layer that is disposed between the first and second bonding layers, and that has a mixture of a rubber material and particles of a secondary material, wherein each of the first and second bonding layers is joined to a respective opposing side of the composite layer.

12. The brake pad of claim 11, further comprising:
a friction material disposed on the braking side of the backing plate.

13. The brake pad of claim 11 wherein the back side is free of structure configured to structurally fix the coating to the backing plate.

14. The brake pad of claim 11, wherein the particles of the secondary material include at least one of:
steel fibers;
sponge iron particles; and
graphite flakes.

15. The brake pad of claim 11, wherein the rubber material includes Polytetrafluoroethylene.

16. A method of producing a brake pad, comprising:
coating a first layer that includes an epoxy material onto a back surface of a backing plate;
coating a second layer onto the first layer coated onto the back surface, the second layer including a mixture of a rubber material and particles of a secondary material; and
coating a third layer that includes the epoxy material onto the second layer coated on the first layer to form, together with the first layer and the second layer, a coating for the back surface of the backing plate.

17. The method of claim 16, further comprising:
prior to the coating of the first layer, performing a degreasing and washing process to at least the back surface of the backing plate; and
after the coating of the third layer, curing the backing plate and the coating.

18. The method of claim 16, further comprising:
applying a friction material to a braking side of the backing plate.

* * * * *